United States Patent
Fenger-Eriksen

(10) Patent No.: US 7,867,143 B2
(45) Date of Patent: Jan. 11, 2011

(54) CLIMBING TREE

(76) Inventor: Jens Fenger-Eriksen, Kirkebjerg Alle 56, Vanlose (DK) DK-2720

( * ) Notice: Subject to any disclaimer, the term of this patent is extended or adjusted under 35 U.S.C. 154(b) by 1115 days.

(21) Appl. No.: 11/587,015

(22) PCT Filed: Apr. 22, 2005

(86) PCT No.: PCT/DK2005/000281

§ 371 (c)(1),
(2), (4) Date: Oct. 20, 2006

(87) PCT Pub. No.: WO2005/102463

PCT Pub. Date: Nov. 3, 2005

(65) Prior Publication Data

US 2007/0221445 A1   Sep. 27, 2007

(30) Foreign Application Priority Data

Apr. 23, 2004   (DK) .............................. 2004 00636

(51) Int. Cl.
*A63B 9/00* (2006.01)
*A01K 15/02* (2006.01)

(52) U.S. Cl. ........................... 482/35; 482/37; 119/706

(58) Field of Classification Search ............. 482/35–37, 482/148; 403/384; 119/702, 706
See application file for complete search history.

(56) References Cited

U.S. PATENT DOCUMENTS

| | | | | |
|---|---|---|---|---|
| 2,122,868 A * | 7/1938 | Morgan | ...................... | 403/290 |
| 2,205,474 A * | 6/1940 | Goeller | ........................ | 403/373 |
| 3,606,315 A * | 9/1971 | Green | .......................... | 482/37 |
| 3,923,409 A * | 12/1975 | Stoner | ........................ | 403/290 |
| 4,772,153 A * | 9/1988 | Huang | ........................ | 403/344 |
| 5,059,053 A * | 10/1991 | Rose | ............................ | 403/24 |
| 5,151,069 A * | 9/1992 | Skalka | ......................... | 482/35 |
| 5,554,074 A * | 9/1996 | Von Parrish | ................ | 472/116 |
| 5,785,447 A * | 7/1998 | Fonti et al. | .................... | 403/49 |
| 6,123,482 A * | 9/2000 | Keller | ......................... | 403/384 |
| 6,377,605 B1 * | 4/2002 | McCaffrey | .................... | 373/95 |
| 6,439,449 B1 * | 8/2002 | Gelfman | ..................... | 228/121 |
| 6,558,295 B2 * | 5/2003 | Araki et al. | ................... | 482/35 |
| 7,572,207 B2 * | 8/2009 | Postma | ........................ | 482/37 |

FOREIGN PATENT DOCUMENTS

GB   1229575   4/1971

* cited by examiner

*Primary Examiner*—Steve R Crow
(74) *Attorney, Agent, or Firm*—AKC Patents LLC; Aliki K. Collins

(57) ABSTRACT

The invention is related to climbing trees. Climbing trees are used for a variety of purposes—cats and other pets and small or slightly older children can derive a lot of pleasure from activities in a climbing tree. Using a specially designed bracket the shape of the climbing tree can be expanded and changed in an almost unlimited range of combinations. The climbing tree can be adapted to the physical aspects of its surroundings. These make the climbing tree exceedingly useful and practical. The new invention consists of different types of brackets to be secured to the columns and where the brackets are the link to new imaginative additions to the climbing tree. The invention can fulfil claims in which the column can have any shape imaginable—e.g. square, triangular—such that the brackets are simply physically shaped to suit that of the column.

18 Claims, 19 Drawing Sheets

FIG 8
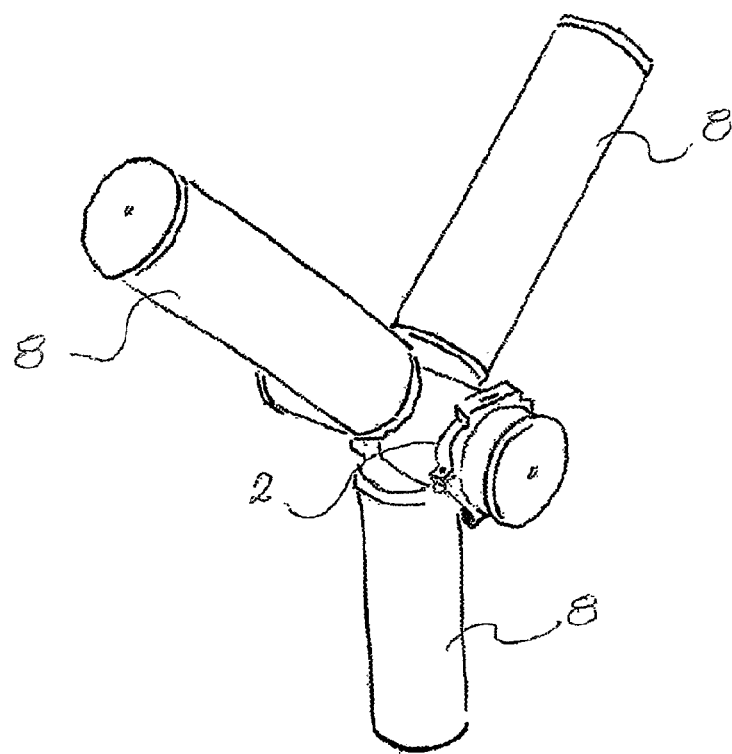
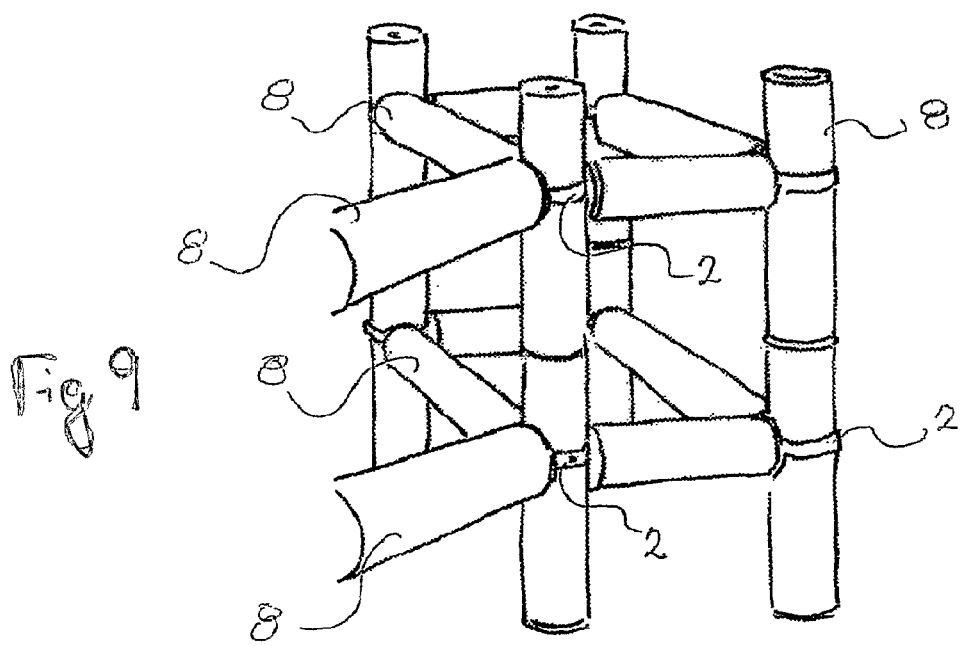

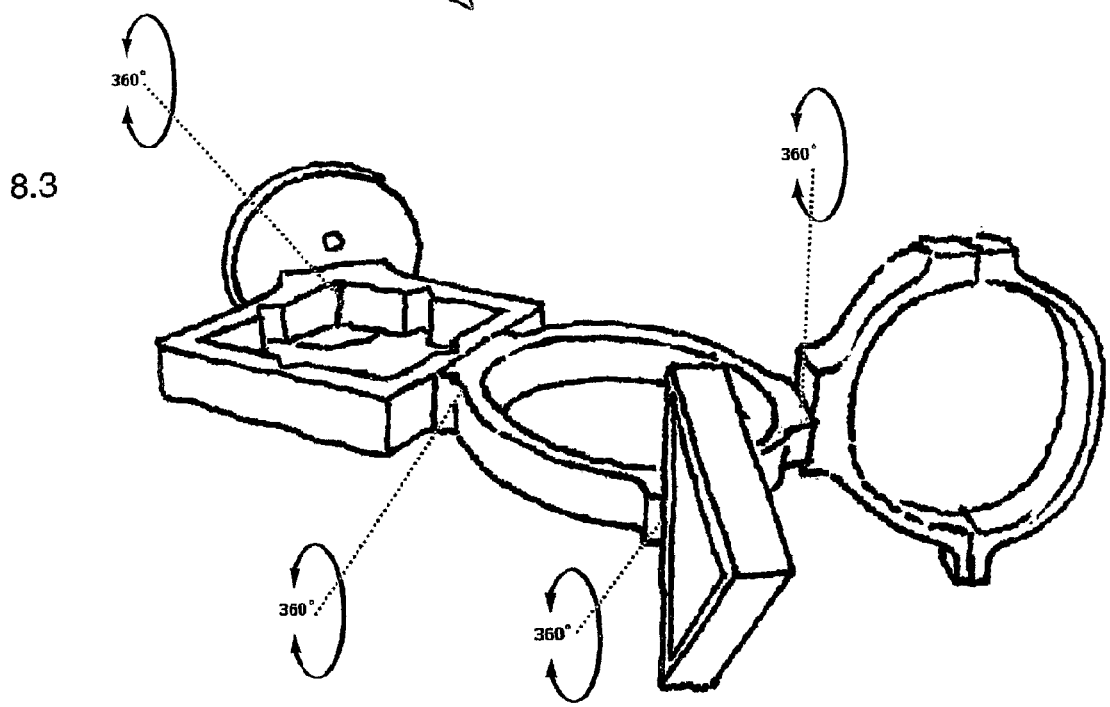

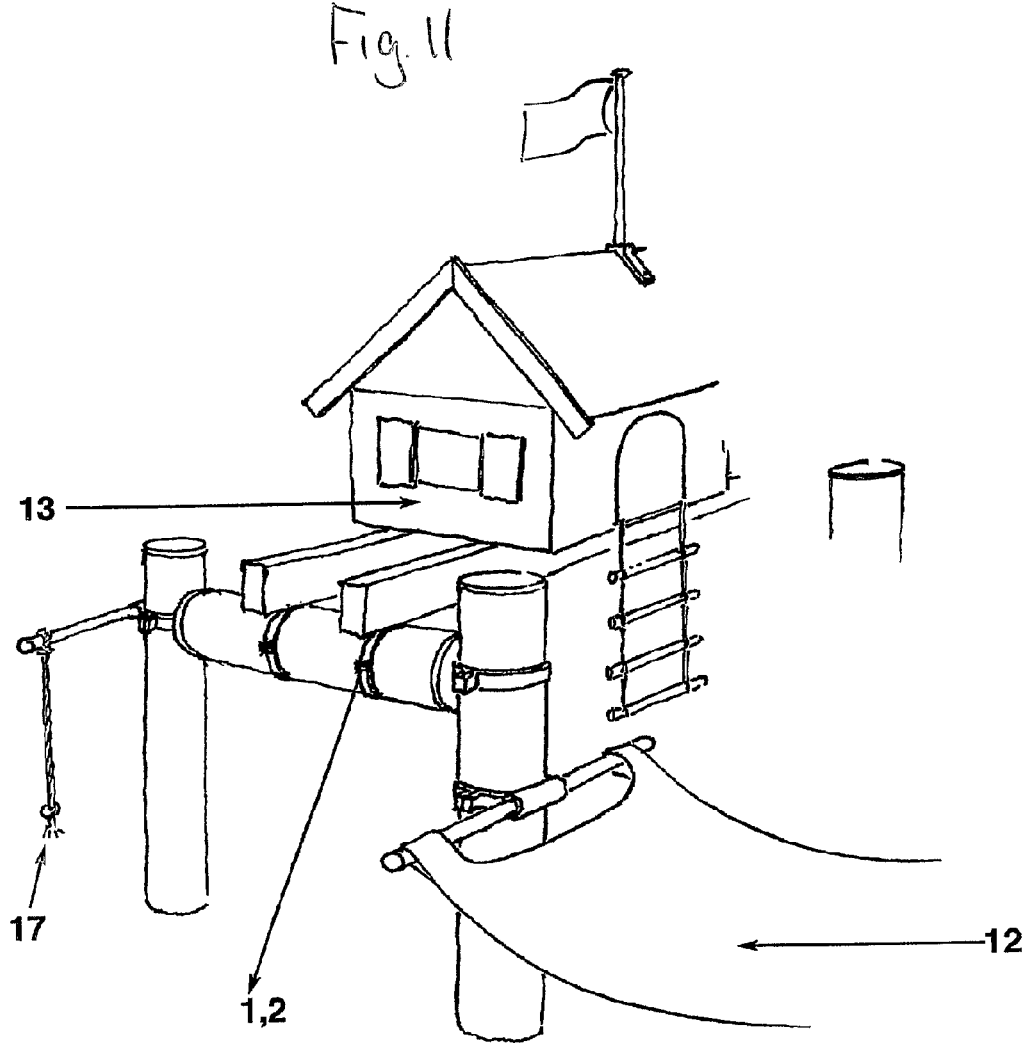

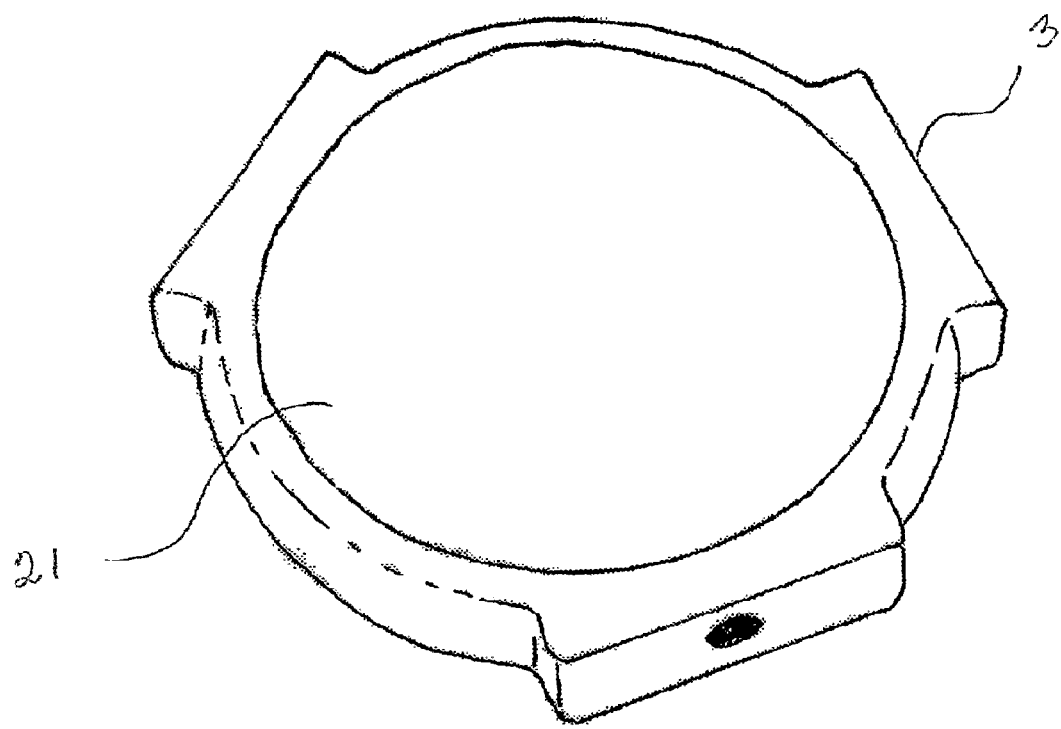

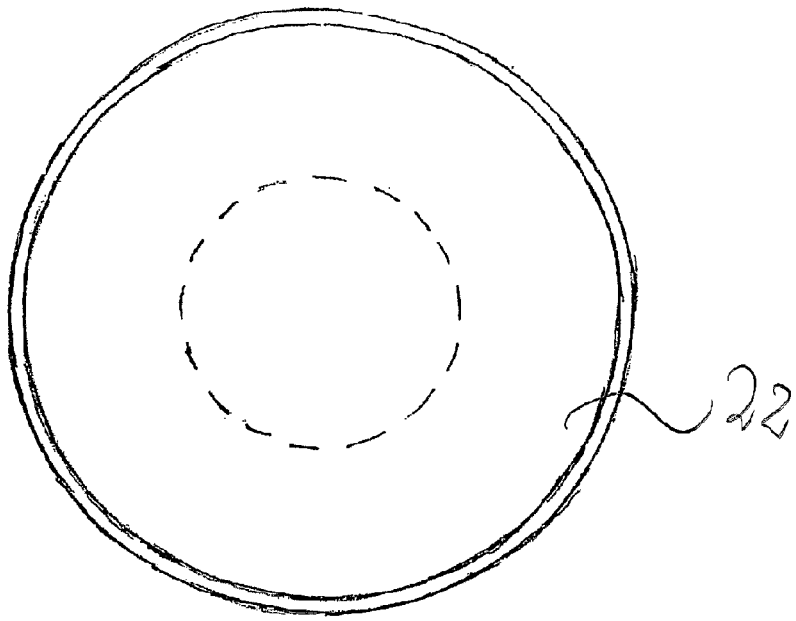
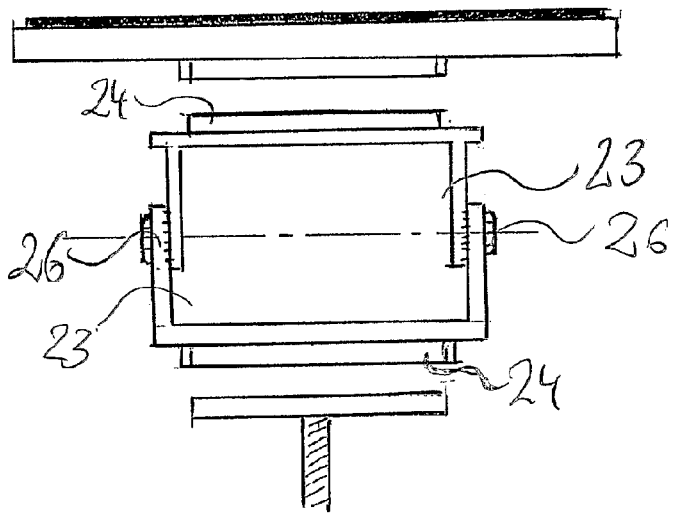
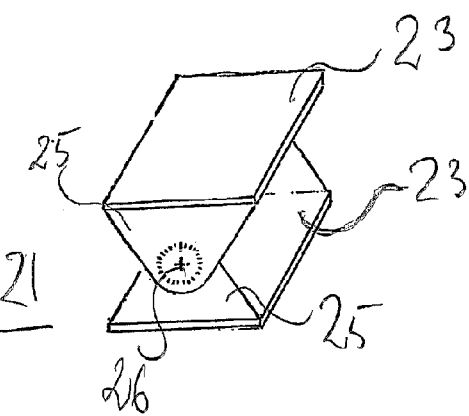

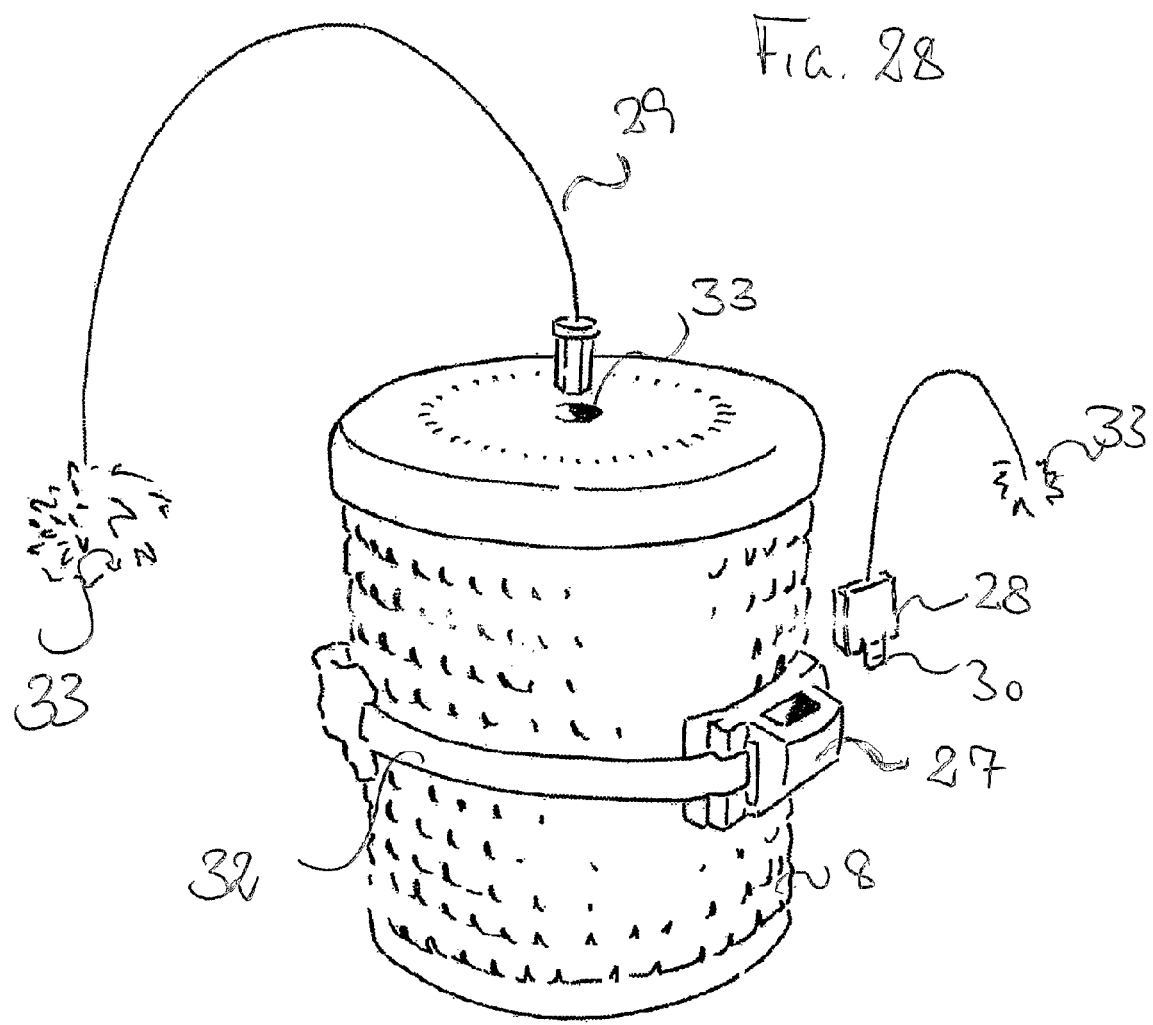

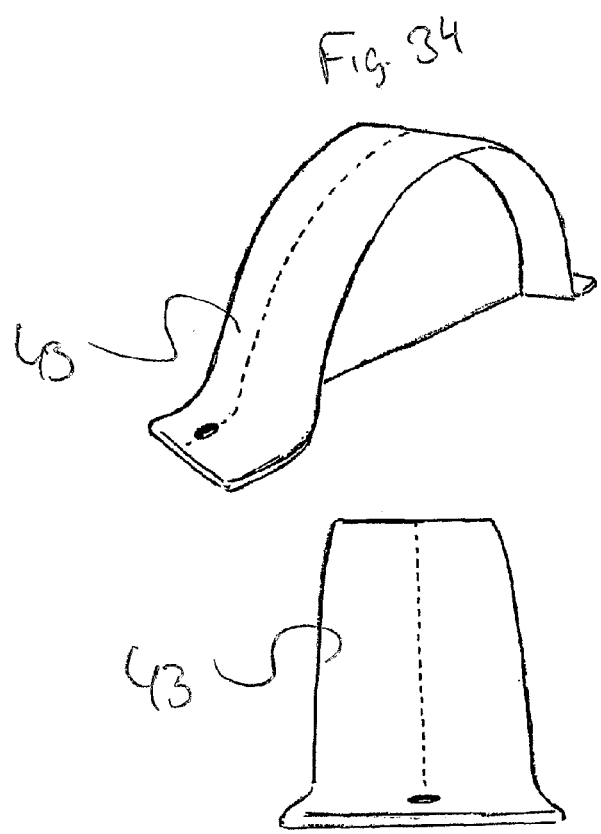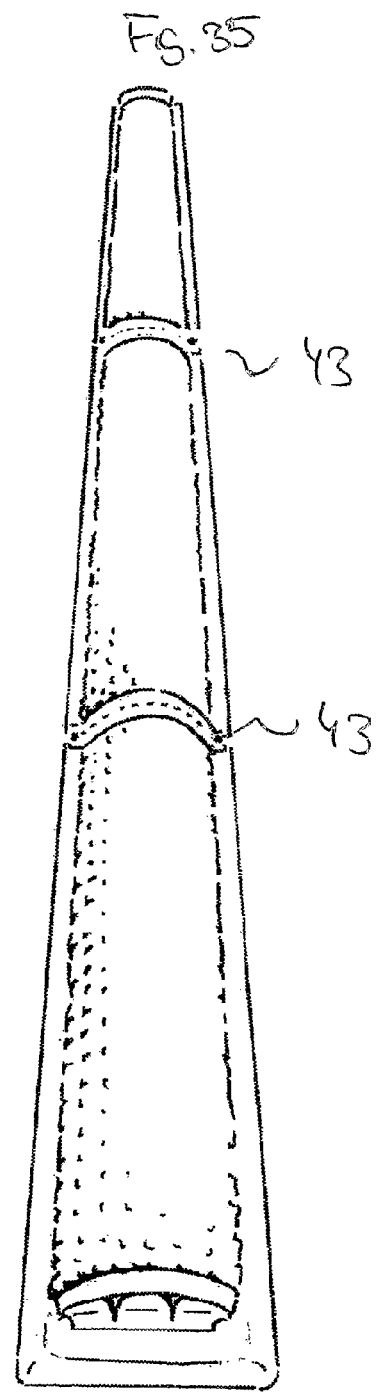

CLIMBING TREE

FIELD OF THE INVENTION

The invention is related to climbing trees, for cats or other pets and for children.

BACKGROUND OF THE INVENTION

Climbing trees are used for cats or other pets and for children. In childcare institutions or private homes, a climbing tree helps promote balance and develop motor function in children. The same applies to cats when climbing and playing in climbing trees.

Examples of comparative models of climbing trees that offer combination options for adaptation include U.S. Pat. No. 5,577,465. Using special joint pegs, new branches can be added to the climbing tree—horizontally or vertically—on an existing column.

In other words, only two options are offered—horizontal and vertical—which is a major limitation in relation to this invention.

SUMMARY OF THE INVENTION

The invention is related to climbing trees, for cats or other pets and for children. Referring to FIG. 9 a climbing tree of this invention includes many columns arranged in different combinations and at various angles. Using a specially designed fitting—a bracket—the shape of the climbing tree can be expanded and changed in an almost unlimited range of combinations. This flexibility makes the climbing tree exceedingly useful and practical. In childcare institutions or private homes, a climbing tree of this new type will help promote balance and develop motor function in children. The same applies to cats when climbing and playing in climbing trees. The climbing tree can be adapted to the physical aspects of its surroundings. Some of the models currently on the market can be adapted in the same practical way, but this new invention offers even more combination options, and most importantly the technical execution of such combinations is much simpler and easier to perform. The new invention includes a bracket that comes in many different sizes but that in principle are all identical in design. The varied sizes are due to the bracket being adapted to the diameter and shape of the columns, which come in many different shapes.

This description is mainly based on the columns being round, but does take into account that the invention can fulfil requirements for which the column may have totally different shapes—e.g. square, triangular—such that the brackets are physically shaped to suit that of the column. In terms of physical execution and appearance, an assembled unit usually consists of 2 brackets mainly of plastic and that are assembled around one of the climbing tree's columns and thus form a circular collar, for example. A single bracket can in itself also be closed unit that can be fastened around a column.

The ends of the brackets are fastened together using a bolt and thread, but can also be joined in other ways, e.g. using a snap-function or hinge.

For each bracket, there can be 1 or more vertical projections (depending on the size) on the main plane, in the middle of which there can be one or more holes or one or more nuts intended for thread or a threaded bolt and in which a threaded bolt or nut can be fitted, for example.

If a threaded bolt is used, it will visibly project several centimetres from the bracket. Matching female elements on the top or bottom of the brackets can be screwed together with the threaded bolt.

If a nut is used, the elements must simply be swapped around so that the female element receives the threaded bolt.

The head of the threaded bolt is principally canted so that it will lock into a similarly canted female socket, (with the same number of cants as the threaded bolt) when screwed into the adjacent part's thread.

The angle of the new bracket to be fitted can be largely determined by the person assembling the tree.

Given the 360° circumference of the column the bracket can be manipulated to a position anywhere around the full 360°, providing unlimited options for the next extension.

The triangular column offers at least three different positions for the brackets, the square column at least four, and so on.

There are almost no limits to the possible extension combinations.

For the sake of stability, it can also be a good idea to use a wall as a support for the climbing tree.

It is very simple—a bracket can be simply screwed securely to the wall through one of the many holes in the bracket. If two brackets are fitted together onto a column, one of the free plane's projecting securing elements on one of the brackets can be used to fasten a third bracket—instead of extending by fitting a new bracket directly to the column. This new bracket will thus also offer a 360° range of potential positions—but on a new level in relation to the preceding bracket.

The base of the columns are sealed with a type of cap, the sides of which expand over the edges of the column and grip the same.

The actual surface of the cap can be fitted with narrow or flat projections in a circle around the centre of the cap. These narrow or flat projections have a practical function. Besides being able to use brackets joined as fittings for extension of the climbing tree, the ends of two brackets can also be fitted together, which is where one of the practical functions of the narrow projections comes into play. When two bracket ends are joined using a threaded bolt, that passes through a hole with a suitable thread in the centre of the cap, the narrow projections automatically form a lock, as they mesh with each other upon physical contact.

A type of track is formed between two of the narrow projections into which the opposing projection locks. Similarly, one or more narrow projections can be added mainly along the surface of the flat projections on the brackets.

These narrow projections have the same function as those on the aforementioned cap—they mesh with the narrow projections on the cap on the column they are fitted to.

By securing brackets to a wall, excellent stability is assured as described above—but the climbing tree can be further secured by a similar means of securing it to the ceiling, whereby securing the end piece of a column to a securing element in the ceiling can achieve the same anti-vibration lock as previously mentioned for two brackets.

Further secure fastening to less robust ceiling types, such as plasterboard, can be achieved by using a replaceable end piece that has a relatively large diameter. This spreads pressure applied to the ceiling over a wider area.

Many ceilings are at an angle and a specially-designed bracket allows the existing top piece to be mounted, allowing the climbing tree to also be securely attached to such ceilings. The movable parts of the bracket are positioned around a sort of shaft that physically holds two sub-components together, that are principally identical. These sub-components are positioned opposite to each other and each consists of a plate with two opposing side components, each of which are tapered away from the plate and the pivotal point, where the tipping function allows them to be positioned with two contact points between the two sub-components, where the side components come to a point and where a shaft is mounted through them.

This provides a tipping function, which means that positioning can be achieved to match the angle of the ceiling.

The surface of the upper sub-component can be secured to the end piece mainly by a sort of circular bayonet fitting, that fits into a female element on the end piece. The same applies to the way the surface of the lower sub-component is secured to the end piece of the column below.

One of the ideas behind this replaceable accessory is that it must be simple to replace the parts.

The inside of the brackets can also be fitted with small sharp anchors (sharp points, ridges or the like) and that use friction to lock the bracket securely to the column.

The character and type of the anchors is adapted to the surface material of the column.

Several other similar measures to lock the brackets securely are stated in the design examples.

Finally, it is worth mentioning that by using a few simple adaptations the climbing tree can be used in totally new ways—e.g. a hammock can be hung from it, a playhouse can be mounted and tunnels and caves can be constructed around it.

The terms of production are extremely favourable. The bracket is very simple and cheap to manufacture and the parts of existing climbing trees can be used with simple adaptation or changes.

The bracket and end pieces can be used to suspend or hang special hanging elements.

A range of cavities or recesses can be included into which specially designed blocks could be fitted by pressing or snapping them into place. The blocks will have a stick or similar on one end of which can be hung a toy—e.g. mouse. Similar accessories could be toys affixed to the columns. A fitting can be attached to the columns which is principally shaped to conform to the physical structure of the column and which consists of a mainly flat disc, upon which is a socket which is the receiving element for a long, spring-like metal arm or the like, to one end of which is a type of male plug which fits into the aforementioned socket by means of a snap-fit function, for example. At the other end could be a toy, typically for a cat.

Upon being hit by a cat's paw the toy will be impelled into jumping and springing movements, which are highly stimulating to a cat's play (hunting) instinct.

The fitting's attachment to the column could be in the form of screws or spikes pressed into the surface material of the column, and by a fastener passing through the bracket and around the column.

The idea is that the accessory will be easy to replace. Similarly, a similar arrangement can be activated on the top of the cap using a long springy metal arm—also attached using a fitting such as an ordinary male/female plug principle, but such that it is possible to lock the position of the male plug in the female socket, such that there is no risk that the toy can be moved through 360°, which can be practical if the arrangement is placed close to a wall—scratch marks on the wall can be a consequence of a cat's attempts to catch an imaginary mouse, if such a locking device is not a feature of the springy metal arm.

The locking device can be in the form of a canted male plug that mates with a corresponding female socket thus locking each other in place.

If the column is positioned such that there is space for a toy to turn through 360° the male and female plug/socket could simply be round.

It will also be possible to make a handle as a female element, such that a person can walk unimpeded around with the toy to play with the cat.

Fitting and removal of the toy using the handle can be using the same simple principle as stated above—e.g. using a snap-fit function.

It will also be possible to fit a remotely controlled electric vibrator to the fitting, to be able to activate vibrations in the toy from a distance. The vibrator could also be activated using a timer, that can automatically activate the vibrator at predetermined times, which will be particularly stimulating for a cat that is alone for long periods of time.

Finally, the climbing tree accessory could consist of a series of climbing or scratching boards.

The climbing/scratching boards are an isolated sub-element that can be replaced as wear and tear dictates—a sort of refill accessory. The sub-elements will be held securely using a sort of holder from which they can be quickly and easily removed and replaced as required. The holders can be situated on ascending levels and be in physical contact with the rest of the climbing tree.

This will make that part of the climbing tree well-suited for climbing and sharpening claws.

BRIEF DESCRIPTION OF THE DRAWINGS

FIG. 21 tipping arrangement seen isolated and in perspective
FIG. 22 male plug mounted on fitting for replaceable and removable toy arrangement
FIG. 23 socket or receiver element
FIG. 24 base with spikes
FIG. 25 socket with spikes seen from above FIG. 26 socket with rectangular receiver element (Female socket)

FIG. 28 adapter for replaceable and removable accessories

FIG. 34 joining elements

FIG. 35 configuration examples with various stages

DETAILED DESCRIPTION OF THE INVENTION

Referring to FIG. 9 a climbing tree of this invention includes many columns arranged in different combinations and at various angles. Using a specially designed fitting—a bracket—the shape of the climbing tree can be expanded and changed in an almost unlimited range of combinations. The configuration examples are mainly based on the columns being round, but do take into account that the invention can fulfill requirements for which the column may have totally different shapes—e.g. square, triangular—such that the brackets are physically shaped to suit that of the column.

Figure 1:
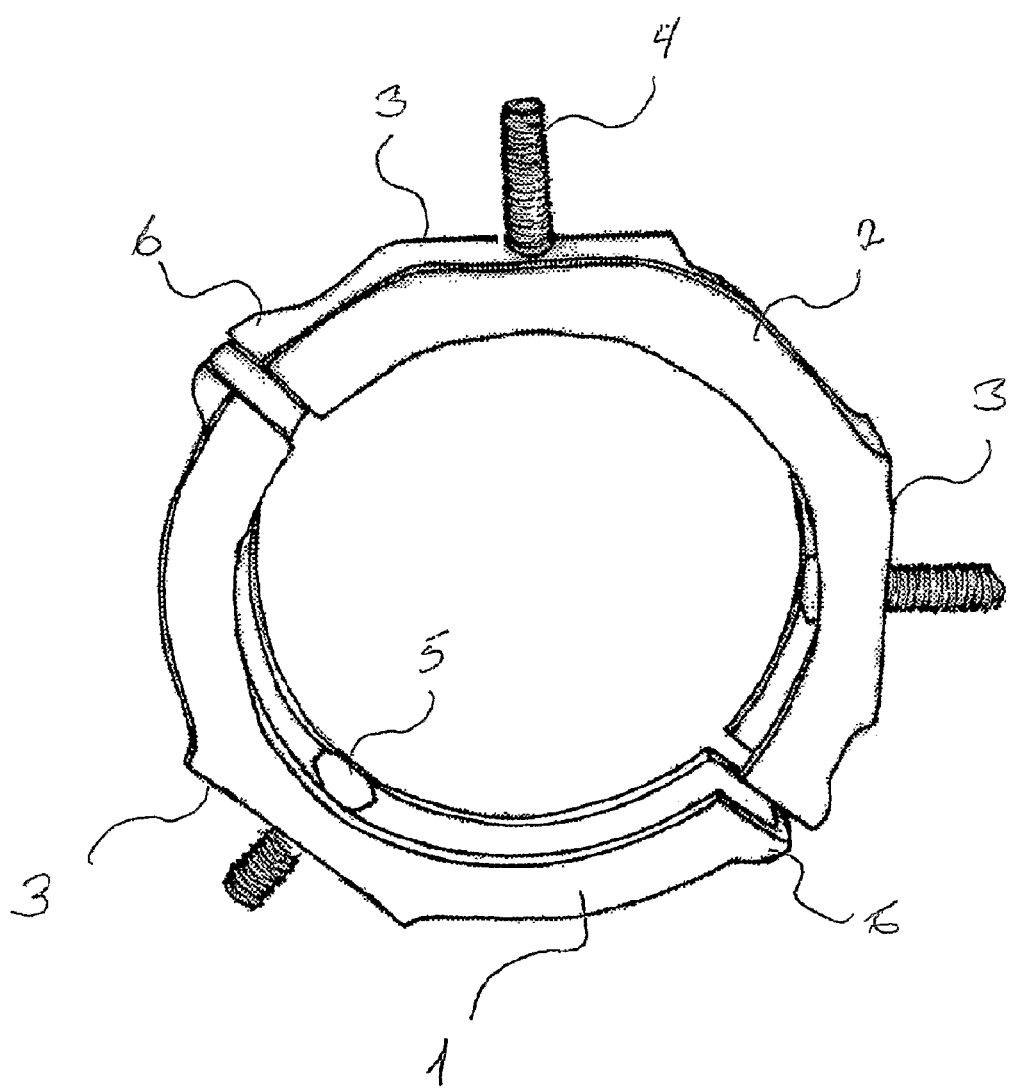
FIG. 1 brackets with 1 and 2 flat projections respectively
FIG. 2 bracket on wall
FIG. 3 cap with narrow anti-vibration projections
FIG. 4 bracket with narrow anti-vibration projection
FIG. 5 illustration of 2 columns in the process of being joined
FIG. 6 unique combination option, bracket to bracket
FIG. 7 examples of brackets
FIG. 7.1 brackets with no friction system
FIG. 7.2 canted brackets
FIG. 7.3 brackets with spikes
FIG. 7.4 brackets with anchors
FIG. 8 combination of brackets with 2 flat projections
FIG. 9 multi-column composition with columns at various angles
FIG. 10 brackets—various combination options
FIG. 11 climbing tree with hammock and house respectively
FIG. 12 end piece closure with cavity for special hanging parts
FIG. 13 bracket with cavity for special hanging parts

FIG. 1 shows 2 brackets (1 and 2).

Bracket 1 has only one flat projection (3) whilst bracket 2 has 2 flat projections (3).

It also illustrates how two brackets can be fastened together using the fastening elements (6). Threaded bolts bind the brackets (1,2) securely together.

But all other stable forms of fastening can also be used—e.g. snap-fit function.

The brackets can be fastened around a column (8) and in this instance will form a circular collar.

The shape and size of the bracket have to adapt to those of the column on which they are to be fitted.

There can be one or more mainly flat projections (3) on each bracket (1,2) where there can be one or more threaded holes in which threaded bolts (4) can be screwed that will visibly project several centimetres from the bracket (1,2).

Matching female elements on the top or bottom of the columns (8) can be screwed together with the threaded bolt.

This arrangement can of course be reversed (bolt in the top or bottom of the column (1,2) and female element (nut) set in the flat projection on the bracket (3)).

Given the 360° circumference of the column (1,2) the brackets can be manipulated to a position anywhere around the full 360°, providing unlimited options for the next extension.

The triangular column offers at least three different positions for the brackets, the square column at least four, and so on. The shape of the column is of major importance to positioning the brackets.

The brackets (1,2) in pairs have mainly the same design and size—whilst in pairs can vary considerably in physical size and shape—size and shape have to be adapted to the shape and diameter of the column (8).

The illustration shows the threaded bolts (4) which screw into the bottom of the columns (8). It can also be reversed—that the threaded bolt from the column is fitted into the nut in the bracket (1,2).

The illustration shows the head of the bolt as (4) hexagonal (5) such that it will fit securely into a correspondingly hexagonal socket in the base of the cavity the bolt head (4) will be forced into when the bolt (4) is screwed sufficiently tightly into the adjacent part.

The idea is that the number of cants corresponds to each other on the bolt (4) and the socket the bolt is locked into.

Figure 2:
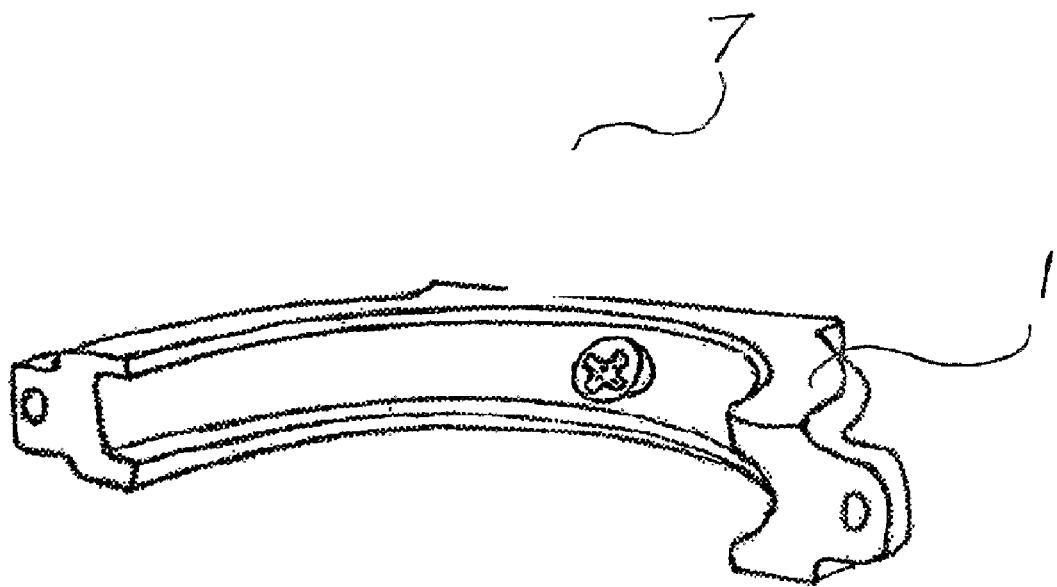

FIG. 2 illustrates bracket 1 secured to a wall (7).

It can be a good idea to use a wall (7) as a firm support for the climbing tree.

It is simple to do so—by drilling a hole and screwing bracket 1 securely to the wall (7) to ensure better stability.

Figure 3:
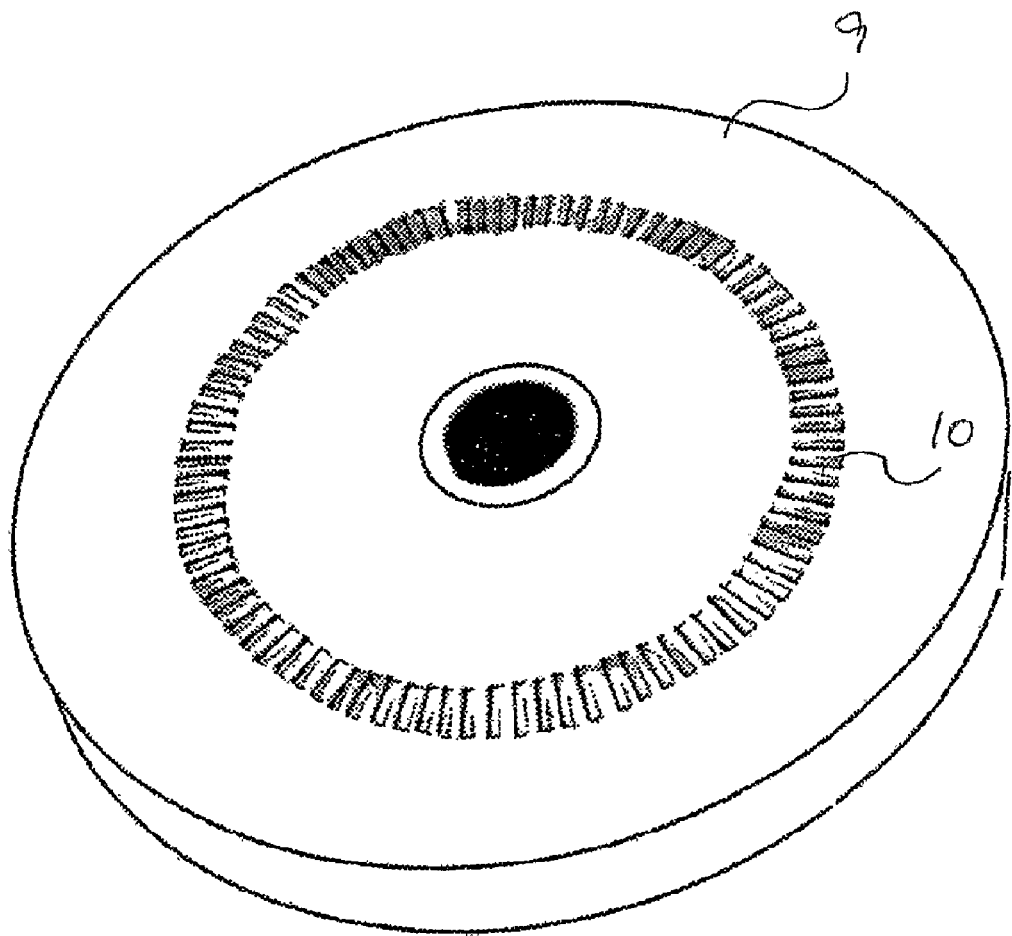

FIG. 3 shows the element used to seal the hole in the bottom or top of a column (8) and which also functions as a kind of cap (9), the sides of which expand over the edges of the column (8), and are dimensioned to fit tightly around the same (8).

The actual surface of the cap (9) is fitted with narrow projections (10) in a pattern e.g. around the centre of the cap (9).

These narrow projections (10) have a practical function as anti-vibration locks for the joint.

The practical function of the narrow projections (10) comes into play when joining two column ends together, for example.

When the ends of two columns (8) are joined together, a locking device is automatically formed by the narrow projections (10), as they mesh together upon physical contact.

Figure 4:
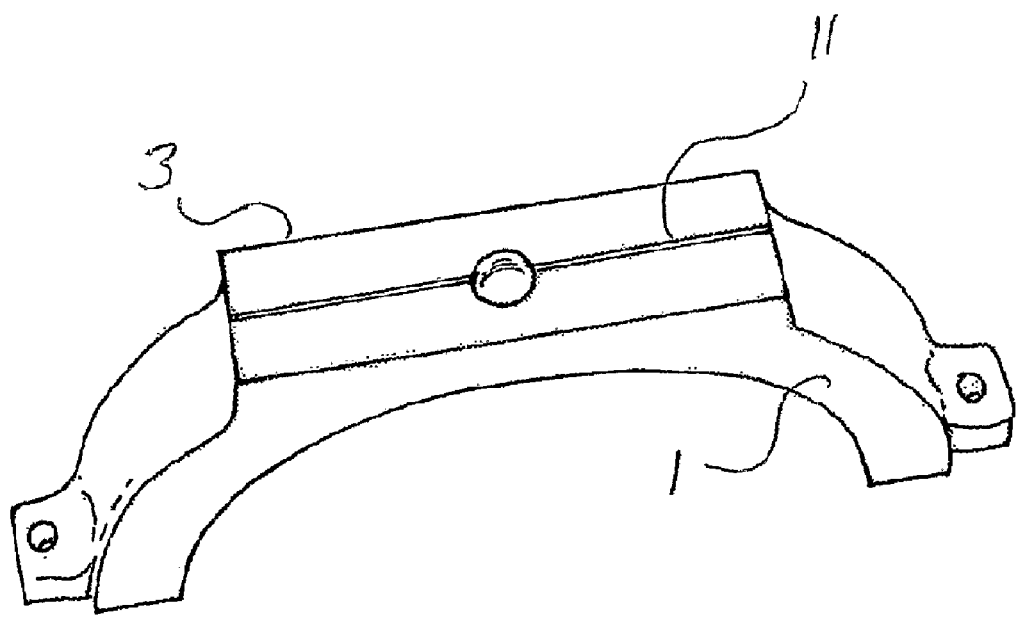

FIG. 4 shows the flat projections of the brackets (3) in which one or more longitudinally-arranged narrow projections can be placed and mainly in the middle of the projection (the illustrations shows only one narrow projection (11)), and that have the same function as those on the caps mentioned above (10).

The narrow projections (10) mesh together.

A type of track is formed between two of the narrow projections into which the opposing projection locks.

This ingenious arrangement helps counter vibration for the entire base of the climbing tree.

Figure 5:
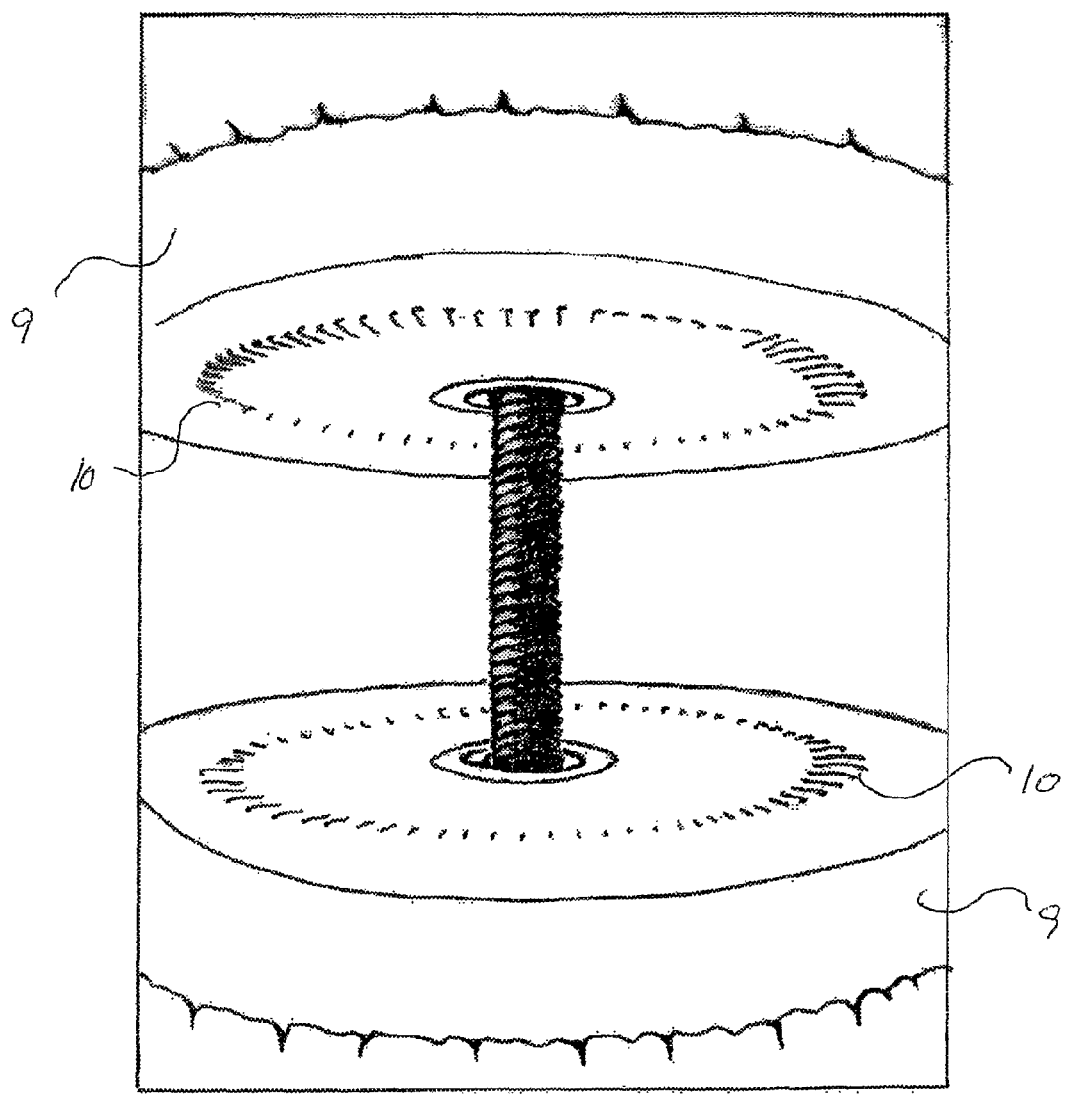

FIG. 5 provides an excellent illustration of how the end surfaces of the two columns are locked thanks to the narrow projections (10) so that even when large cats jump on the climbing tree it will not affect its stability.

Figure 6:
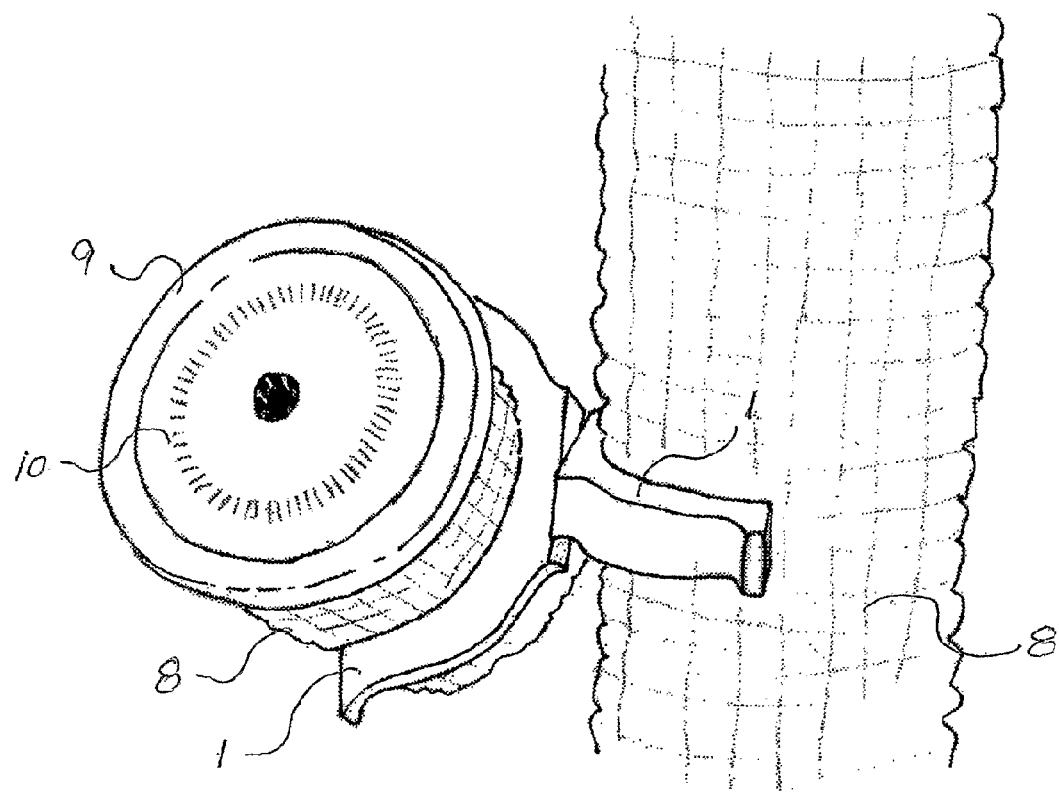

FIG. 6 shows even more of the innumerable combinations possible.

If two brackets (1,2) are joined as a single unit (collar) around a column (8), one of the fastening points of the flat projections (3) on one of the brackets can be used to fix another bracket (1,2) similarly onto the fastening point of the flat projection of the second bracket. This new bracket (1,2) will thus also offer a 360° range of potential positions—but on a new level in relation to the preceding bracket (1,2).

Figure 7:
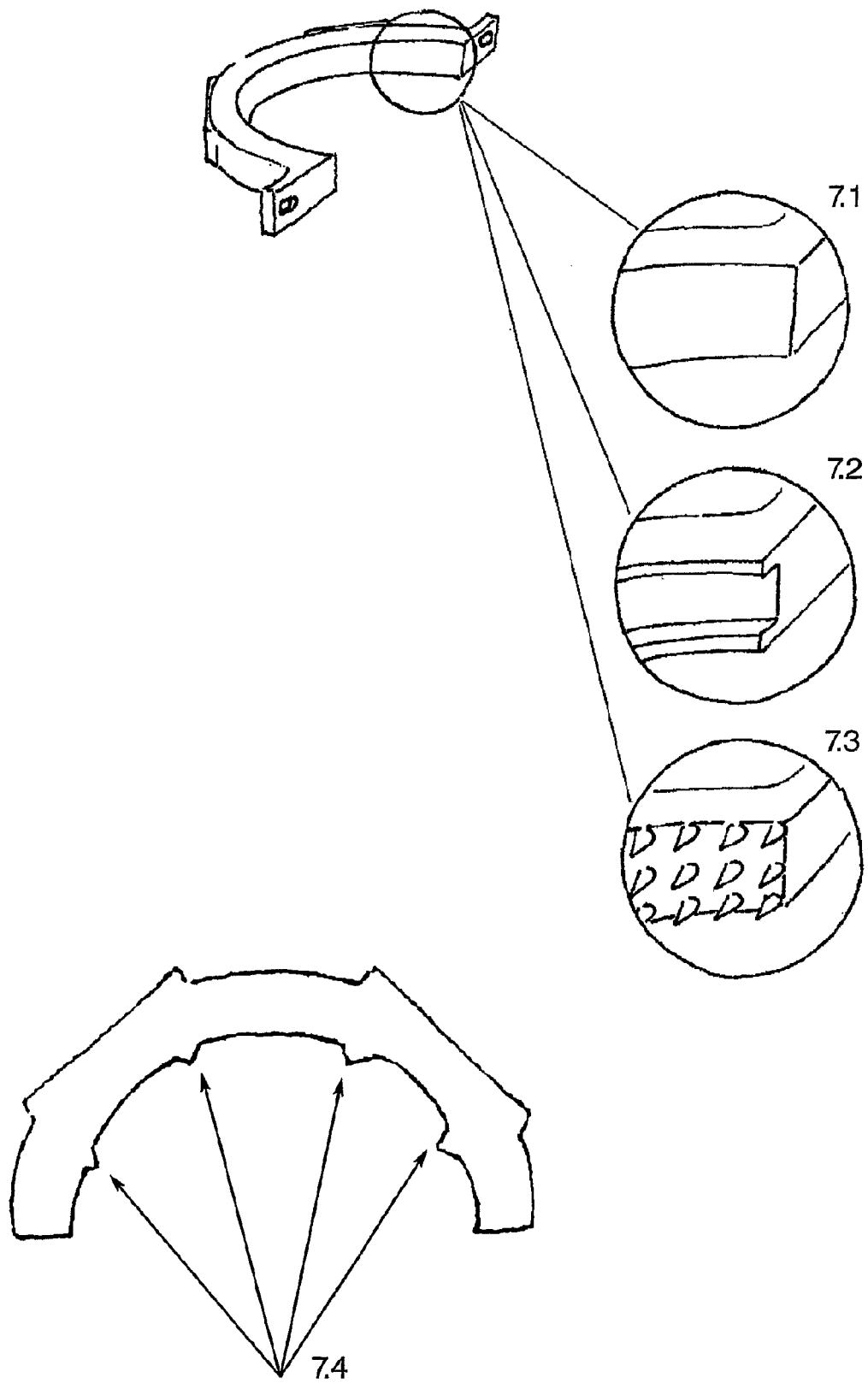

FIG. 7 shows examples of how the brackets can be secured against slipping on the columns.

FIG. 7.1 shows a bracket with no slip-prevention.

FIG. 7.2 shows a bracket on which slipping is prevented using extra edges.

FIG. 7.3 shows a bracket on which slipping is prevented using spikes.

FIG. 7.4 brackets with anchors.

FIGS. 7.1 to 7.4 show how the brackets can be locked firmly on the column (8), if the surface material of the columns is of a nature that facilitates this.

FIG. 8 illustrates the combination of brackets with 2 flat projections (3), whilst FIG. 9 shows a large climbing tree with many columns and different combinations.

FIG. 10 shows a selection of the innumerable combinations possible for the various bracket designs.

FIG. 11 demonstrates how such accessories as a hammock (13) or a house (14) can be added to the climbing tree.

Figure 12:
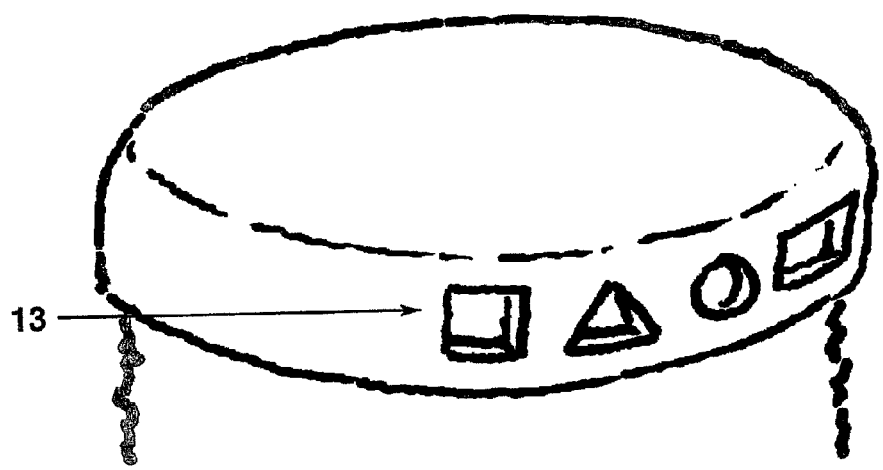

FIG. 12 shows a range of cavities or recesses (14) in the end pieces into which specially designed blocks (15) could be fitted by pressing or snapping them into place.

Figure 13:
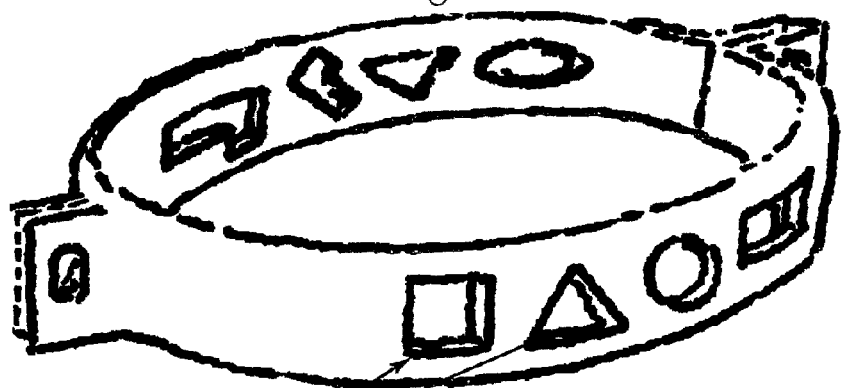

FIG. 13 shows the same as in FIG. 10 except in brackets.

Figure 14:
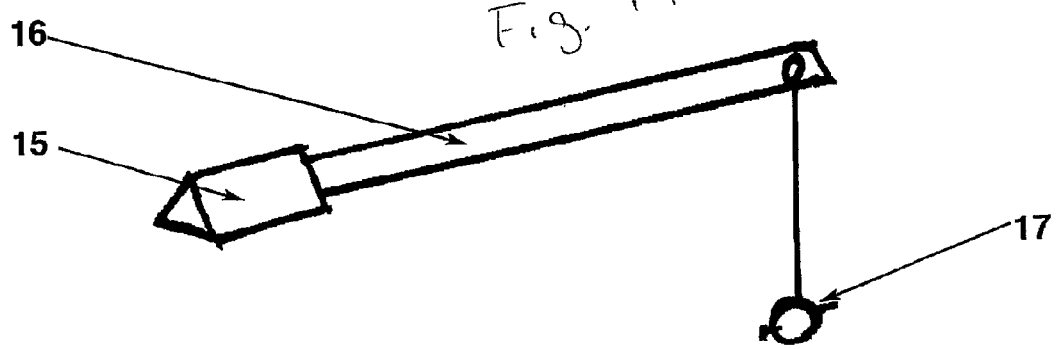
FIG. 14 shows how the blocks (15) are fitted with a stick (16) on the end of which a toy can be hung—e.g. mouse.
Figure 15:
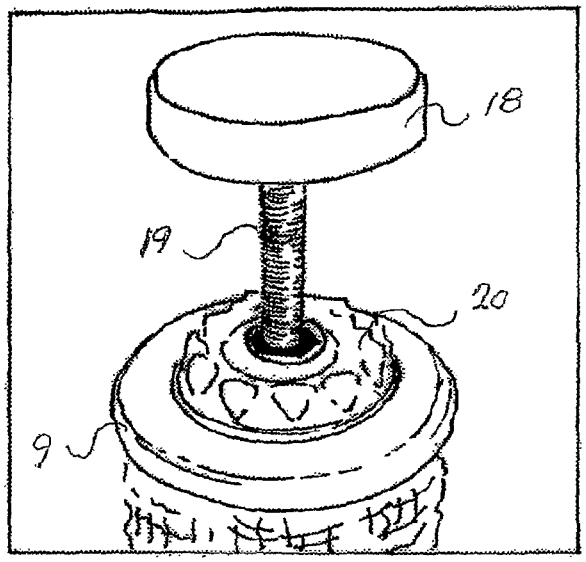
FIG. 15 wing nut and cap—anti-vibration lock, 1 wing nut (20) screwed on column cap (9)
FIG. 16 2 wing nuts (20) screwed at a distance from the column cap
FIG. 17 3 wing nuts (20) seen upside down
FIG. 18 end piece integrated with bracket function for joining
FIG. 19 large diameter end piece
FIG. 20 tipping arrangement for angled ceilings illustrated with fastening elements for upper end piece and lower column end piece.
Figure 16:
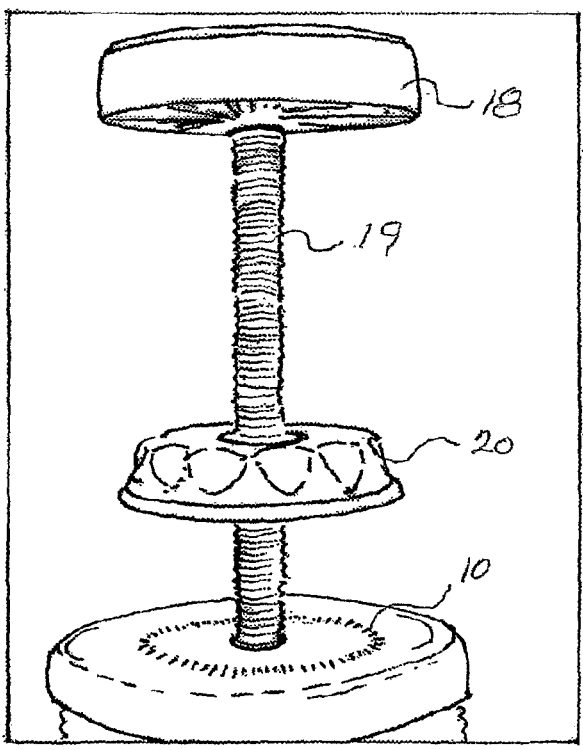
Figure 17:
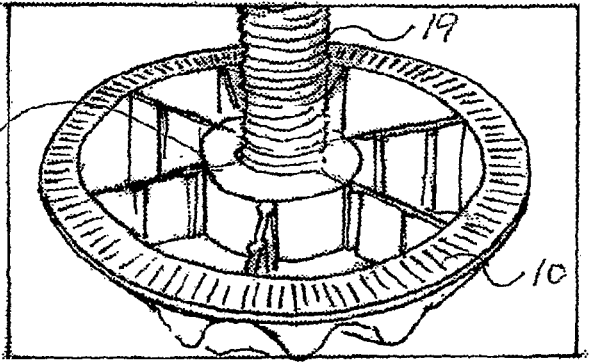
Figure 22:
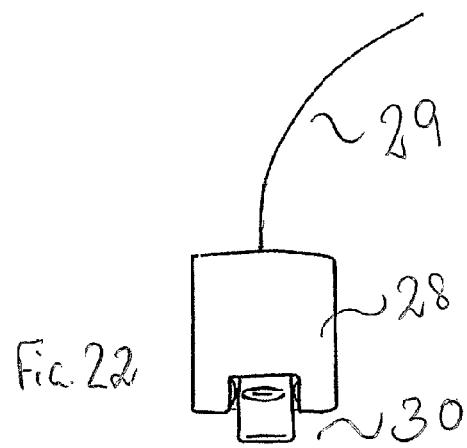
Figure 23:
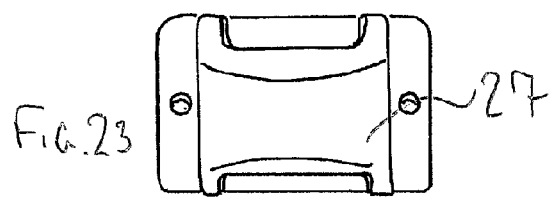
Figure 26:
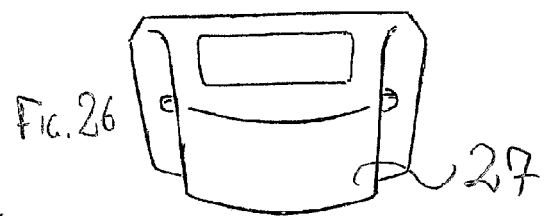
Figure 24:
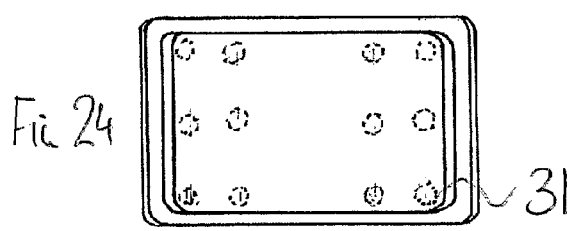
Figure 27:
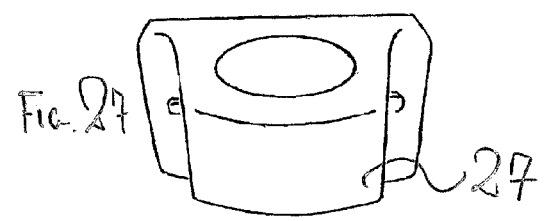
FIG. 27 socket with round receiver element (female socket)
Figure 25:
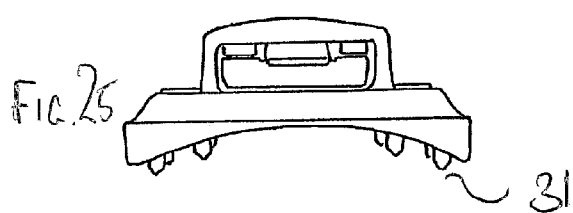
Figure 29:
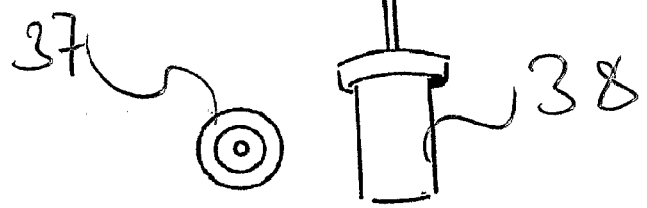
FIG. 29 round male and female plug/socket
Figure 30:
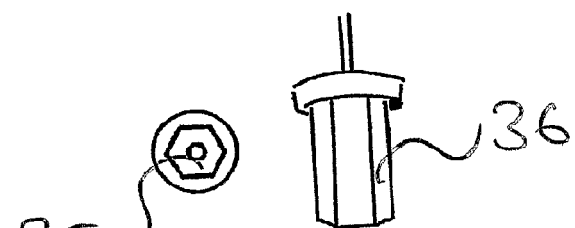
FIG. 30 canted male/female plug/socket
Figure 31:
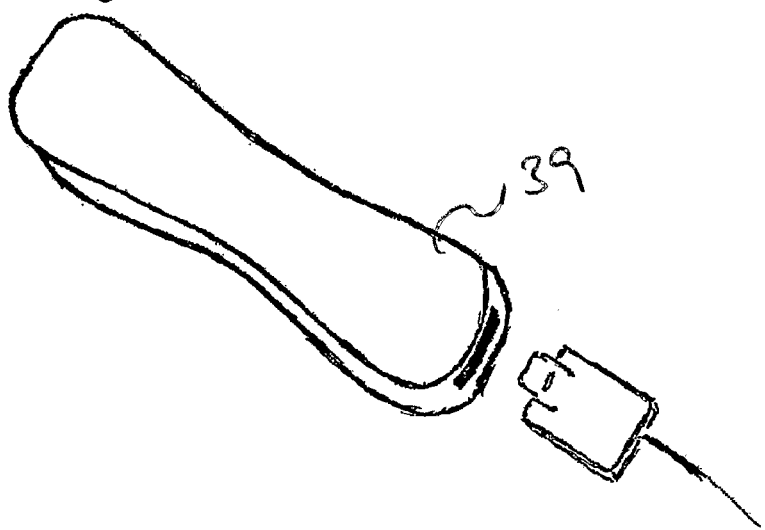
FIG. 31 handle
Figure 32:
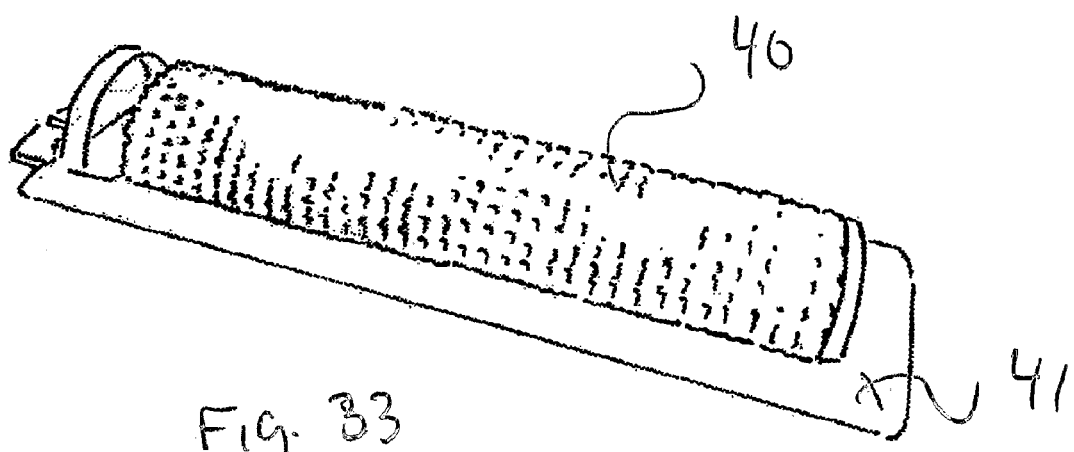
FIG. 32 climbing and scratching parts in holder element
Figure 33:
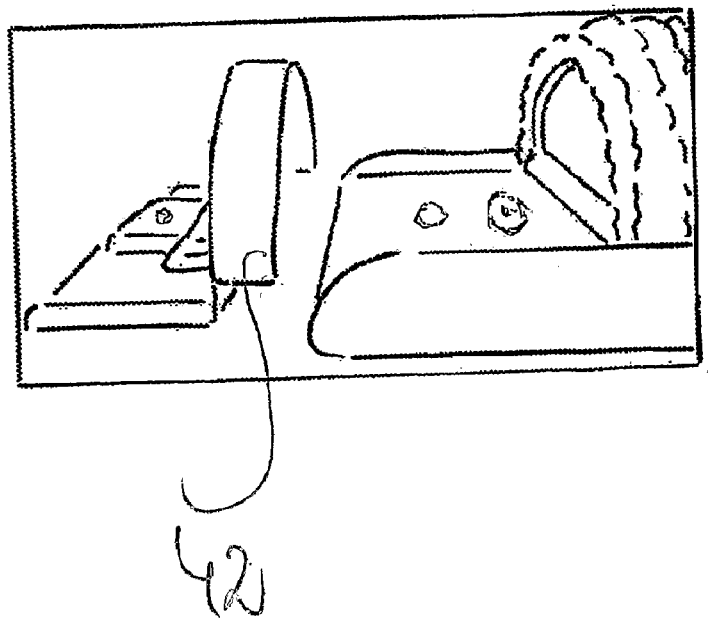
FIG. 33 configuration example of fitting and removal

FIG. 14 shows how the blocks (15) are fitted with a stick (16) on the end of which a toy can be hung—e.g. mouse. FIGS. 15, 16 and 17 show how columns can be secured to a ceiling with particular reference to demonstrating the anti-vibration measures.

FIG. 15 shows the wing nut (20) screwed onto the column cap (9).

FIG. 16 where the wing nut (20) is screwed at a distance from the column cap illustrates how the recesses in the column and cap respectively prevent vibration.

The cap (18) on the threaded shaft (19) is forced against the ceiling proportional to the wing nut (20) being screwed down towards the column cap. The recesses (10) in the column cap and corresponding wing nut (20) can be seen clearly in FIG. 17 where it (20) is seen upside down. FIG. 18 shows the cap with integrated bracket function. FIG. 19 shows an example of a replaceable end piece with large diameter such that the pressure applied here is spread over a larger area of the ceiling, such that the end piece can be secured against relatively weak ceilings, such as plasterboard.

FIG. 20 is a fitting designed for angled ceilings. The movable parts of the bracket are positioned around a sort of shaft (25) that physically holds two sub-components (22) together, that are principally identical. These sub-components are positioned opposite to each other and each consists of a plate with two opposing side components (24), each of which taper away from the plate and the pivotal point (25), where the tipping function allows them to be positioned with two contact points between the two sub-components (24), where the side components are pointed and where a shaft is mounted through them.

The surface of the upper sub-component can be secured to the end piece mainly by a sort of circular bayonet fitting (23) that fits into a female element (23) on the end piece. The same applies to the way the surface of the lower sub-component is secured to the end piece of the column below. Similar accessories could be toys affixed to the columns (8). A fitting can be attached to a column (8) which is principally shaped to conform to the physical structure of the column and which consists of a mainly flat disc, upon which is a housing which is the receiving element (27) for a long, spring-like metal arm (29) or the like, to one end of which is a type of male plug (28) which fits into the aforementioned socket (27) by means of a snap function (30), for example. At the other end could be a toy, typically for a cat.

The fitting's attachment to the column could be in the form of screws or spikes (31) pressed into the surface material of the column (8), and by a fastener passing through the bracket and around the column.

Similarly, a similar sort of arrangement can be activated in the top of the cap consisting of an adapter (34) for replaceable and removable accessories—with a long metal arm—attached using a fitting such as an ordinary male/female plug/socket principal, but with the option of locking the positioning of the male plug in the female socket. The locking device can be in the form of a canted male plug (35) that mates with a corresponding female socket (36) thus locking each other in place.

If the column (8) is positioned such that there is space for a toy to turn through 360° the male plug (37) and female socket (38) could simply be round.

It will also be possible to make a handle (39) as a female element, such that a person can walk unimpeded around with the toy to play with the cat.

Fitting and removal of the toy using the handle can be using the same simple principle as stated above—e.g. using a snap-fit function.

It will also be possible to fit a remotely controlled electric vibrator to the fitting, to be able to activate vibrations in the toy from a distance. The vibrator could also be activated using a timer, that can automatically activate the vibrator at predetermined times, which will be particularly stimulating for a cat that is alone for long periods of time.

The climbing/scratching boards are an isolated sub-element that can be replaced. The sub-elements (49) will be held securely using a sort of holder (42) from which they can be quickly and easily removed and replaced as required. The holders (41) can be situated on ascending levels and be in physical contact with the rest of the climbing tree.

This will make that part of the climbing tree well-suited for climbing and sharpening claws.

NUMBERING 1 bracket with one flat projection
2 bracket with two flat projections
3 flat projections
4 one of the threaded bolts
5 hexagonal bolt head
6 bracket joint elements
7 wall for mounting a bracket
8 column
9 column cap
10 narrow projections on cap
11 narrow projections on bracket
12 hammock
13 house
14 recess/cavity
15 blocks
16 stick mounted in block designed to fit recess
17 toy—here a mouse
18 cap against ceiling
19 threaded shaft
20 wing nut
21 cap with integrated bracket function
22 large diameter end piece
23 sub-components combined with brackets with tipper function
24 fastening elements
25 side components for 22
26 pivotal point for bracket with tipper function
27 socket
28 male plug on toy part
29 springy metal arm
30 snap-lock element
31 spikes
32 fastener
33 toy
34 adapter for replaceable accessories on top of column
35 canted male plug
36 canted female socket
37 round male plug
38 round female plug
39 handle
40 climbing/scratching boards, replaceable elements
41 holder element
42 example of fastening in holder element—with bayonet 43 fitting for retaining the climbing/scratching boards between the various levels.

Several embodiments of the present invention have been described. Nevertheless, it will be understood that various modifications may be made without departing from the spirit and scope of the invention. Accordingly, other embodiments are within the scope of the following claims.

What is claimed is:

1. A modular climbing tree comprising:
    at least a first generally vertical column comprising a top and a bottom;
    a first cap attached to said bottom, wherein said cap seals said bottom and comprises sides extending over said first column's edge and wherein said cap further comprises a first fastening element extending from its center;
    at least a first bracket comprising first and second equal sized bracket components and wherein said first and second bracket components are shaped and dimensioned to be placed around and to conform to said first column's shape and wherein said first and second bracket components are joined together via bracket joint elements and wherein each of said bracket components comprises an outer surface comprising one or more flat projections; and
    a plurality of fastening bolts arranged upon said flat projections and a second column surrounded by a second bracket and wherein said second column is attached to said first column by attaching the first bracket to said second bracket via at least one of said fastening bolts; wherein the relative orientation of said brackets is adjustable.

2. The modular climbing tree of claim 1 further comprising a third column surrounded by a third bracket and wherein said third column is attached to said first column by attaching said third bracket to said first cap via said first fastening element.

3. The modular climbing tree of claim 1 wherein said first cap comprises a surface having a locking device and wherein said locking device comprises a plurality of strip-like projections arranged in a circle around the center of the cap and wherein said flat projections of said bracket components comprise one or more mainly longitudinally aligned locking devices that interlock with said locking device of the cap.

4. The modular climbing tree of claim 1 wherein each of said fastening bolts comprises a threaded body and a canted head and wherein said canted head locks down into a socket formed in said first bracket having the corresponding number of cants as the canted head.

5. The modular climbing tree of claim 1 wherein inner sides of said first bracket comprise arrangements configured to frictionally lock said first bracket securely to the first column and wherein said arrangements comprise one of sharp anchors, sharp points or ridges.

6. The modular climbing tree of claim 1 wherein said first bracket and said first cap comprise recesses configured to receive a block attached to one end of a stick having another end from which a toy is hung.

7. The modular climbing tree of claim 1 wherein said first cap is integrated with said first bracket.

8. The modular climbing tree of claim 1 further comprising a replaceable end piece attached to said first column top and wherein said end piece is secured to a securing element in a ceiling.

9. The modular climbing tree of claim 8 further comprising an angled bracket for mounting said first column to an angled ceiling wherein said angled bracket comprises first and second movable parts configured to pivot around a pivot axis and wherein each of said movable parts comprise a flat surface and a tapering projection from said flat surface and wherein said movable parts are joint along the narrowest point of the projections and pivot around an axis passing through said narrowest point.

10. The modular climbing tree of claim 9 wherein said angled bracket and said end piece are removably attached to said first column via a circular bayonet plug that conforms to a correspondingly shaped socket.

11. The modular climbing tree of claim 1 further comprising a flat bracket and a fastener, wherein said flat bracket comprises a flat disc attached to a side of said first column via screws or spikes pressed into the surface material of the first column and wherein said fastener passes through the flat bracket and around the first column and mainly conforms to the shape of the first column's physical structure and wherein said flat bracket further comprises a socket for receiving a long springy metal arm on one end of which is a male plug that conforms to said socket and snap-locks into said socket and at the other end of the metal arm is a toy.

12. The modular climbing tree of claim 11 wherein said flat bracket is attached to the top of the cap and wherein said long springy metal arm comprises a locking device in the form of a canted male plug matching a corresponding canted female socket formed in said flat bracket.

13. The modular climbing tree of claim 11 further comprising a purpose-designed and freely-moving handle configured to be fitted and snap-locked in said flat bracket socket.

14. The modular climbing tree of claim 1 further comprising a bracket for toys fitted with a remote-controlled electric vibrator with or without timer.

15. The modular climbing tree of claim 1 wherein said first column further comprises one of climbing accessories, holder elements with removable scratching boards configured to be securely retained in said holder elements using specially designed fittings or holder elements configured to hold fittings for multi-level construction.

16. The modular climbing tree of claim 1 wherein said first column comprises one of circular cross-section, rectangular cross-section, triangular cross-section or polygonal cross-section, and wherein said first bracket comprises a corresponding matching cross-section.

17. The modular climbing tree of claim 1 wherein said bracket joint elements comprise one of bolt and thread, snapping elements, or a hinge.

18. The modular climbing tree of claim 1 further comprising a second cap attached to said top of said first column.

* * * * *